(12) United States Patent
Alexandre et al.

(10) Patent No.: US 6,654,416 B1
(45) Date of Patent: Nov. 25, 2003

(54) DEVICE AND PROCESS FOR REGULATING BIT RATE IN SYSTEM FOR THE STATISTICAL MULTIPLEXING OF IMAGE STREAMS CODED ACCORDING TO MPEG2 CODING

(75) Inventors: Patrice Alexandre, Cesson Sévigné (FR); Jean-Louis Diascorn, Carmel, IN (US); Thierry Lavenan, Rennes (FR)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/520,205

(22) Filed: Mar. 7, 2000

(30) Foreign Application Priority Data

Mar. 9, 1999 (FR) .......................................... 99 02907

(51) Int. Cl.[7] .............................. H04B 1/66; A04J 3/22; G06R 9/36
(52) U.S. Cl. .................. 375/240.02; 382/239; 370/465
(58) Field of Search ...................... 375/240.02, 240.1, 375/240.28, 240.08, 240.03, 240.24, 240.11; 348/387.1, 397.1, 404.1, 423.1, 424.1, 424.2; 370/465, 537, 538; 382/239

(56) References Cited

U.S. PATENT DOCUMENTS

| 5,115,309 | A | * | 5/1992 | Hang | ..................... 375/240.11 |
| 5,861,919 | A | | 1/1999 | Perkins et al. | ............... 348/385 |
| 5,878,166 | A | * | 3/1999 | Legall | ..................... 375/240.24 |
| 6,167,084 | A | * | 12/2000 | Wang et al. | ........... 375/240.02 |
| 6,212,233 | B1 | * | 4/2001 | Alexandre et al. | ..... 375/240.03 |
| 6,310,915 | B1 | * | 10/2001 | Wells et al. | ........... 375/240.03 |
| 6,483,543 | B1 | * | 11/2002 | Zhang et al. | .......... 375/240.08 |

FOREIGN PATENT DOCUMENTS

| EP | 0924933 A1 | 6/1999 | ............ H04N/7/26 |
| WO | WO97/18676 | 5/1997 | ............ H04N/7/50 |
| WO | WO99/03282 | 1/1999 | ............ H04N/7/26 |

\* cited by examiner

*Primary Examiner*—Gims S. Philippe
(74) *Attorney, Agent, or Firm*—Joseph S. Tripoli; Joseph J. Laks; Ronald H. Kurdyla

(57) ABSTRACT

A device for regulating bit rate in a system for statistically multiplexing several streams of MPEG 2 coded images is disclosed. The statistical multiplexing system includes a device (1) for allocating bit rate using the complexity calculated by a bit rate regulating device (10). Each coder E(i) of an image stream includes a first coding device (20) for performing spatial coding, a second coding device and a memory for storing the complexity $X^{1st}$| of the last image coded spatially by the first coding device. The complexity ($X^-_{GOP}$) of the last group of pictures is coded by the second coding device (30). Device (10) regulates the bit rate of coder E(i) for determining the complexity value for the next image coded by the second coding device (30), using stored complexity values. This complexity value is transmitted to the bit rate allocator (1) to determine the next bit rate sent to the coder E(i).

14 Claims, 5 Drawing Sheets

DEVICE AND PROCESS FOR REGULATING BIT RATE IN SYSTEM FOR THE STATISTICAL MULTIPLEXING OF IMAGE STREAMS CODED ACCORDING TO MPEG2 CODING

FIELD OF THE INVENTION

The present invention relates to a device and a process for regulating bit rate in a system for the statistical multiplexing of streams of images coded according to the MPEG 2 coding standard. This process and this device are integrated, for example, on each coder of a statistical multiplexing system.

BACKGROUND OF THE INVENTION

A system for coding according to the MPEG 2 video standard uses the properties of the signal to reduce the bit rate thereof.

The coding algorithm implemented describes the images blockwise by exploiting the spatial and temporal redundancies of the images to be coded.

The spatial redundancy is processed, mainly, by virtue of the succession of three operations: an operation commonly called the discrete cosine transform and denoted DCT, an operation of quantizing the coefficients emanating from the DCT and a variable-length coding operation VLC for describing the quantized coefficients emanating from the DCT.

The DCT transformation makes it possible to transform a two-dimensional spatial representation consisting of the digitized video image into a spectral representation in which one is unaware of the phase. This DCT transformation leads to the production of a matrix of the dimension of a block where each coefficient corresponds to a combination of two frequencies, horizontal and vertical, given that the coefficients for the low frequencies are located at the top left of the matrix.

The quantization of the coefficients emanating from the matrix of the DCT transformation consists in expressing these coefficients according to values which are multiples of the quantization interval adopted. In this regard, the coefficients which are less than the quantization interval or level are coded with the value zero. Finally, the variable-length coding consists in coding each coefficient of the matrix once quantized according to a coding of entropy type which associates the smallest binary code with the commonest values of quantized coefficients. The coefficients of the matrix are traversed in a zigzag, starting from the element located at the top left of the matrix (continuous component) and terminating at the one located at the bottom right of the matrix (maximum horizontal and vertical frequencies).

The coding of the coefficients of the matrix terminates when all the coefficients have been traversed or else when the last non-zero coefficient is reached (a specific escape character is then used). Thus, the more zero coefficients there are in the matrix on completion of the quantization, the smaller is the length of the binary train for coding an image, that is to say the volume of data transmitted. On the other hand, the smaller this volume of data, the smaller the quantity of information about the image to be coded, thereby incurring the risk of inducing the appearance of quantization artifacts visible during image reconstruction by the decoder.

The temporal redundancy is analysed via a motion compensation operation which consists in searching, via a translation operation in respect of each block of the current image, for the most similar block located in a reference image. Analysis of the temporal redundancy leads to the determination of a field of translation vectors, commonly called motion vectors, as well as of a prediction error which is the difference between the signal of the current image and the signal of the image predicted by motion compensation. The prediction error is then analysed according to the principle of spatial redundancy.

MPEG 2 coding is a coding of predictive type. It follows that the decoding procedure associated therewith must be regularly reinitialized so as to protect the signal against any transmission error or any signal break due to the toggling of the decoder from one program to another.

To this end, the MPEG 2 standard provides that, periodically, the images must be coded in spatial mode, that is to say according to a mode exploiting spatial redundancy only. The images coded in spatial mode are commonly called INTRA images or I images.

The images coded by exploiting temporal redundancy are of two types: there are, on the one hand the images constructed by reference to a temporally earlier image and on the other hand, the images constructed by reference to a temporally earlier image and to a temporally later image.

The coded images constructed by reference to a temporally earlier image are commonly called predicted images or P images and the coded images constructed by reference to a temporally earlier image and to a temporally later image are commonly called bidirectional images or B images.

An I image is decoded without reference being made to images other than itself. A P image is decoded by referring to the P or I image which precedes it. A B image is decoded by calling on the I or P image which precedes it and on the I or P image which follows it.

The periodicity of the I images defines a group of images widely denoted GOP (the acronym standing for "Group Of Pictures").

As is known to the person skilled in the art, within a single GOP, the quantity of data contained in an I image is generally greater than the quantity of data contained in a P image and the quantity of data contained in a P image is generally greater than the quantity of data contained in a B image.

In order to manage this disparity in the quantities of data according to the type of image, an MPEG 2 coder comprises a device for slaving the data bit rate.

Such a slaving device makes it possible to control the stream of coded data. It comprises a buffer memory, for storing the coded data, and models the state of the dual buffer memory of a so-called reference decoder. The slaving device smoothes the bit rate of the data exiting the buffer memory in such a way that the sum of the data contained in the coder and in the reference decoder is constant.

Thus, as a function of the type of image (I, P or B) this involves managing the fact that the I images produce a bit rate greater than the mean bit rate (typically equal to 3 to 6 times the mean bit rate), that the P images produce a bit rate of close to the mean bit rate and that the B images produce a bit rate less than the mean bit rate (typically equal to 0.1 to 0.5 times the mean bit rate).

Furthermore, when the coded video signals of a program are intended to be multiplexed with, other signals of the same type from other program, it is known practice to share the global bit rate of the multiplex between the various signals. This configuration is found, for example, during broadcasting of video program by satellite. In this case, the bit rate of the multiplex may reach 40 MB/s, thus permitting the transport of several programs simultaneously (10 programs at 4 MB/s each for example).

A video program emanating from an MPEG 2 type coding at fixed bit rate exhibits, after decoding, a variation in the quality of the image restored. This stems from the variability of the entropy of the video signal over time, this variability being evidenced by a fluctuation in the quantization level of the DCT coefficients.

An appropriate allocation of the bit rates associated with the video program then makes it possible to globally increase the quality of the video programs as a whole and/or to raise the number of programs broadcast. According to the prior art, the result of coding the GOP of order k is then used as prediction of the expected coding difficulty for the GOP of order k+1.

The cost of coding each image is variable. It is the role of the regulating loop to correct the stream variations due to the variations in the complexity of the image (defined hereinbelow) and to transmit as output a stream of data corresponding to a stipulated bit rate. This regulation generally acts on the quantization interval which is dependent on the level of fill of the buffer memory at the output of the coder. This buffer memory makes it possible to absorb the bit rate deviations due to the variations in volume of the coded images depending on their type (I, P or B) as well as to the bit rate deviations due to the response time of the regulating loop.

The data stream at the output of a coder of a video source may be variable. It may indeed be beneficial, for example, in the case of a transmission of several video sources on a single channel, to distribute the available "global" bit rate of this channel among the various sources in a dynamic manner, that is to say as a function of the evolution of the complexity of the images to be coded of each video source. This process makes it possible to improve the global quality of the images transmitted, as compared with the existing processes, for example, those assigning a fixed bit rate to the video sources as a function of the type of program transmitted.

FIG. 2 represents an overall transmission using such a process. This involves transmitting several coded video sources on a single transmission channel with constant global bit rate. This bit rate corresponds to its capacity, for example, that of the channel of a transponder. The circuits for coding the video sources (E'(i)) are linked to the input of a multiplexer (2.a) whose output provides the data flow to be transmitted over the channel. They are also linked to an interface circuit (14) which transmits the data relating to the complexity of the video sources to a bit rate allocator (1.a) and receives the bit rates allocated to each source by this bit rate allocator (1.a). The latter, which therefore has the role of allotting a bit rate to each source (E'(i)), controls the multiplexing circuit or multiplexer (2.a). The information is exchanged by way of a fast bus to which is subscribed the bit rate allocator (1.a) and the interface circuit (14). A supervisory circuit (15) is linked to this bus so as to ensure the management of the overall transmission. Likewise, each encoder E'(i) comprises a bit rate regulating device (10.a) calculating the expected complexity of the next image to be coded according to the above principle.

The multiplexing is performed, for example, image by image, as a function of the bit rate allotted by the bit rate allocator to each video source transmitted over the same channel. This bit rate is dependent on a coefficient of complexity of the video source taking into account the volume of information generated for a given quantization interval. This coefficient is measured for each GOP of each video source. It corresponds, for example, to the number of bits used to code a GOP, the quantization interval being constant or else to a normalized count of bits corresponding to the number of bits multiplied by the quantization interval if this interval is variable. The manner of operation of the variable bit rate coding process is ensured by the regulating loop which uses the buffer of the coder in a manner known per se.

The exploitation of variable bit rate encoders associated with statistical multiplexing dependent on the bit rate of each source such as described above is known and is a means of optimizing the capacity of the channel of the transponder.

However, these statistical multiplexing systems have numerous drawbacks. In particular, it is found that for a given quantization level, some sequences will be identical to the original whilst others will exhibit degradations. This evidences the fact that the quantization level is insufficient to characterize the quality of an image.

Likewise, the statistical multiplexing systems of the prior art tend to assign an identical quantization interval to all the encoders of the system. However, rendering the quantization level homogeneous regardless of the source engenders a poor distribution of coding quality. Thus, simple sequences will be greatly penalized and complex sequences will take too much bit rate.

SUMMARY OF THE INVENTION

The object of the present invention is therefore to alleviate the drawbacks o the prior art by proposing a device for regulating the bit rate of a system for the statistical multiplexing of streams of images coded according to the MPEG 2 coding standard, thereby making it possible to homogenize the rendition of subjective quality for all the programs of a statistical multiplexing system regardless of the type of sequence.

In accordance with the principles of the present invention, the statistical multiplexing system includes a device for allocating bit rate based on the complexity calculated by the bit rate regulating device. Each image stream coder includes a first spatial coded so as coder for performing a first spatial coding of images to determine the coding cost of each image if it had to be spatially coded and in advance with respect to a second actual coding by a second coding device. The complexity value of the last image spatially coded by the first coder is stored together with the complexity of the last group of pictures actually coded by the second, coder the last bit rate allotted by the bit rate allocation device. The device for regulating the coder bit rate for determining the complexity value for the next image coded by the second, coder uses a prerecorded program and the stored values. The bit rate regulating device also includes means for transmitting the complexity value to the bit rate allocating device for determining the next bit rate stipulations sent to the coders.

According to another particular feature, the quantization interval used by the bit rate regulating device to determine the complexity of the image to be coded is the maximum quantization interval between the last three quantization intervals determined by the bit rate regulating device, during the coding by the first coding device.

According to another particular feature, the bit rite regulating device comprises first means of calculating the square root of the value of the complexity previously calculated by the program, this value corresponding to the value transmitted by the bit rate regulating device to the bit rate allocator by the transmission means.

According to another particular feature, the bit rate regulating device comprises first means of calculating the square root of the value of the complexity previously calculated by the programme, this value corresponding to the value transmitted by the bit rate regulating device to the bit rate allocator by the transmission means.

According to another particular feature, the bit rate regulating device comprises second means for performing a minimum thresholding and a maximum thresholding of the value of the complexity.

According to another particular feature, the thresholding of the complexity is carried out by a comparator which determines the minimum value between, on the one hand the maximum threshold, and on the other hand the maximum between the minimum threshold and the last complexity calculated which is multiplied by a determined coefficient.

According to another particular feature, the first and second means consist respectively of a program module recorded on the storage means.

According to another particular feature, the bit rate regulating device is connected to a preprocessing device comprising at least one measurement device for detecting a change of scene and/or a lap dissolve by performing an analysis of the correlation between two successive images (inter correlation) between the pixel line of one image and the line of like rank of the following image, or an analysis of the correlation within an image (intra correlation) between the lines of one and the same image, the result of this analysis is transmitted to the bit rate regulating device which comprises a means of determining a complexity value adapted to the change of scene and/or to the lap dissolve, this value corresponding to the value transmitted by the bit rate regulating device to the bit rate allocator by the transmission means.

According to another particular feature, the preprocessing device which comprises a device for measuring intra correlation, after having successively detected a decorrelation then a recorrelation within an image (intra correlation), sends a signal to the bit rate regulating device, which is analysed as the detection of a lap dissolve, and the bit rate regulating device assigns in respect of a determined number of following images to be coded, a complexity value corresponding to the maximum threshold, the number of following images to be coded corresponding to the number of images contained in a group of pictures increased by one picture, this value corresponding to the value transmitted by the bit rate regulating device to the bit rate allocator by the transmission means.

According to another particular feature, the preprocessing device which comprises a device for measuring inter correlation, after having detected a strong decorrelation between two successive images (inter correlation), sends a signal to the bit rate regulating device which is representative of the measurement of the level of decorrelation between the two images, this signal being analysed by the bit rate regulating device as the detection of a change of scene, so as to evaluate the complexity which will be applied to a determined number of following images, as a function of the decorrelation level calculated by the preprocessing device.

A second object of the invention consists of a process for regulating bit rate of a coder of a statistical multiplexing system making it possible to guarantee identical rendition of subjective quality for all the programs of the statistical multiplexing system regardless of the type of sequence.

This aim is achieved by the fact that the process for regulating bit rate of each coder for a statistical multiplexing system, the statistical multiplexing system comprising a bit rate allocation device connected to each bit rate regulating device of each coder, each coder comprising a first coding device carrying out the spatial coding and with a lead time for all the images actually coded subsequently by a second coding device, the process comprising:
  a step of storage on means of storage of the bit rate regulating device of each coder of values representative of the complexity of the last image coded by the first coding device, of the complexity of the last group of pictures coded by the second coding device, and of the last bit rate received from the bit rate allocator by the regulating device,
  a step of calculating the estimate of the complexity of the next image coded by the second coding device on the basis of the values previously stored,
  a step of transmitting the estimated complexity value of the next image coded by the second coding device to the bit rate allocation device.

According to another particular feature of the present invention, the bit rate regulating process comprises:
  a second step of calculation, determining the complexity of the next image coded by the second coding device as the square root of the complexity determined by the first calculation step.

According to another particular feature of the present invention, the bit rate regulating process comprises:
  a step of analysing a measurement of the correlation between two successive images making it possible to determine the presence of a change of scene and a quantity representative of the level of decorrelation between the two images,
  a step of transmitting to the bit rate regulating device a signal representative of the detection of a change of scene and a quantity representative of the level of decorrelation between the two images,
  a step of evaluating, by the bit rate regulating device, the value of the complexity of a determined number of images subsequently coded by the second coding device, as a function of the quantity representative of the level of decorrelation between the two images,
  a step of transmitting, by the bit rate regulating device, the value of the complexity for the determined number of images, to the bit rate allocator.

According to another particular feature of the present invention, the bit rate regulating process comprises:
  a step of analysing the measurement of the correlation between the lines of one and the same image so as to determine the presence of a lap dissolve in a sequence of images,
  a step of transmitting a signal representative of the detection of a lap dissolve to the bit rate regulating device, and corresponding to the detection of a decorrelation then of a recorrelation between a pixel line of an image and the line of directly higher rank of the same image,
  a step of transmitting, by the bit rate regulating device, to the bit rate allocator, a value of the complexity for a determined number of images subsequently coded by the second coding device, the value of the complexity corresponding to the maximum threshold of complexity allowable by the bit rate allocator.

BRIEF DESCRIPTION OF THE FIGURES

Other particular features and advantages of the present invention will become more clearly apparent on reading the description given hereinbelow with reference to the appended figures in which.

DETAILED DESCRIPTION OF PREFERRED EMBODIMENTS

Figure 1:
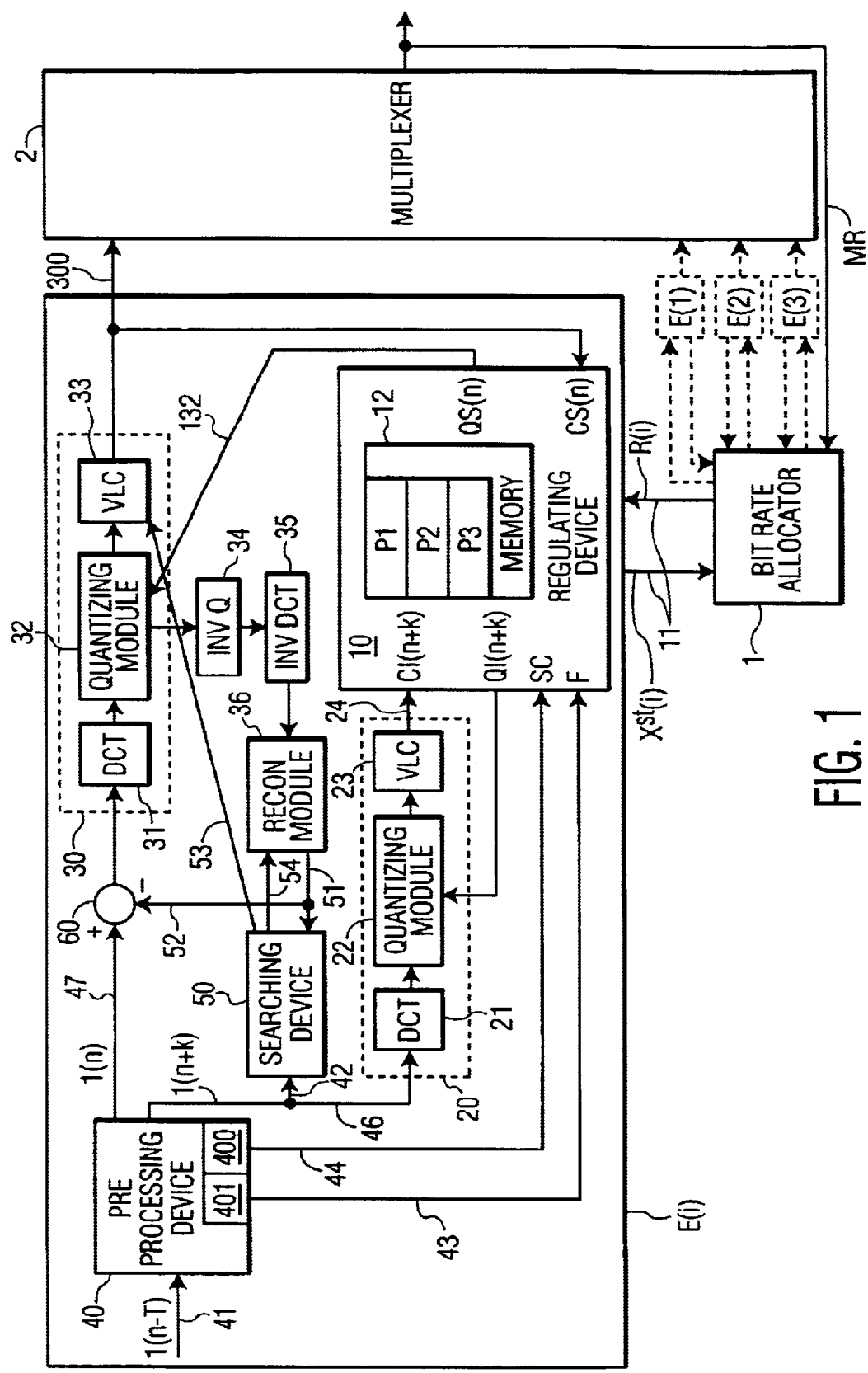
FIG. 1 represents a diagram of a statistical multiplexing system using the bit rate regulating device according to the invention.

Before describing the present invention in detail, it is appropriate to return to the principle of MPEG 2 coding in an encoder and to the principle of bit rate allocation in a statistical multiplexing system of the prior art.

At the input of an encoder, there is a system for storing images before compression. These stored images are analysed beforehand. Each time an image exits so as to be coded, an image is stored. During this storage, operations are performed. These operations consist in particular in measuring the difference between images and the difference between blocks of an image. It is in this preprocessing phase that forms which characterize the motion are defined.

A video image originating from a source consists of a plurality of blocks called Macroblocks by the person skilled in the art. Each Macroblock represents a matrix of 16*16 pixels. An image in the NTSC format comprises 1350 Macroblocks per 30 images per second. An image in the PAL/SECAM format comprises 1620 Macroblocks for 25 images per second so as to represent substantially the same volume of data as the images in the NTSC FORMAT. Each block enters a DCT transformation module where the spatial representation represented by each Macroblock is transformed into a spectral representation where one is unaware of the phase. The image thus transformed is thereafter quantized, by a stage for quantizing the coefficients of the DCT transformation. The quantized image is then coded by way of a variable-length coding (VLC, of the HUFFMANN coding type). At output a binary train is generated comprising a succession of information items describing each Macroblock of the image, each coefficient of the matrix emanating from the quantization is coded on 8 bits. The reduction in cost, that is to say in the size of the binary train, is carried out by way of the quantization. Indeed, through quantization, certain coefficients (Aij with 1<i<16 and 1<j<16) of the 16*16 DCT matrix will be zero. In particular, the coefficients of the matrix for the high indices (i, j) in the horizontal (i) and vertical (j) dimensions, since these coefficients correspond to high frequencies. Now, a video signal consists essentially of low frequency signals. The DCT transformation concentrates the useful information onto the coefficients of the matrix with indices of low values.

If the bit rate at the output of an encoder is constant, the quantization level is altered in such a way as to ensure that the cost generated at the output is in accordance with the bit rate stipulation. To do this, the coder uses a bit rate regulating module, which, by observing the cost generated from Macroblock to Macroblock, adjusts the quantization level so that in the end the bit rate over the image complies with the stipulation. For a given bit rate, the quantity of information, or the spectral richness of the images will prompt the requirement to vary the quantization interval so that the cost after coding is fixed. This signifies that complex images are quantized severely so as to satisfy constraints of low bit rate, and consequently engender visible quantization artefacts. As a specific measure of the incoming images, a simple relation such as that below is used:

$$X = C \times Q \qquad (a)$$

In this formula, X is the complexity of the image to be coded, C is its cost and Q the mean quantization interval used for the coding of the image. As a first approximation, this quantity is constant for small variations in quantization. Indeed, by increasing the quantization level, the coding cost is decreased. Thus, a characterization of the source is obtained independently of the quantization level. This complexity measurement constitutes the basic measurement used in the principle of allocation of statistical multiplexing.

Figure 2:
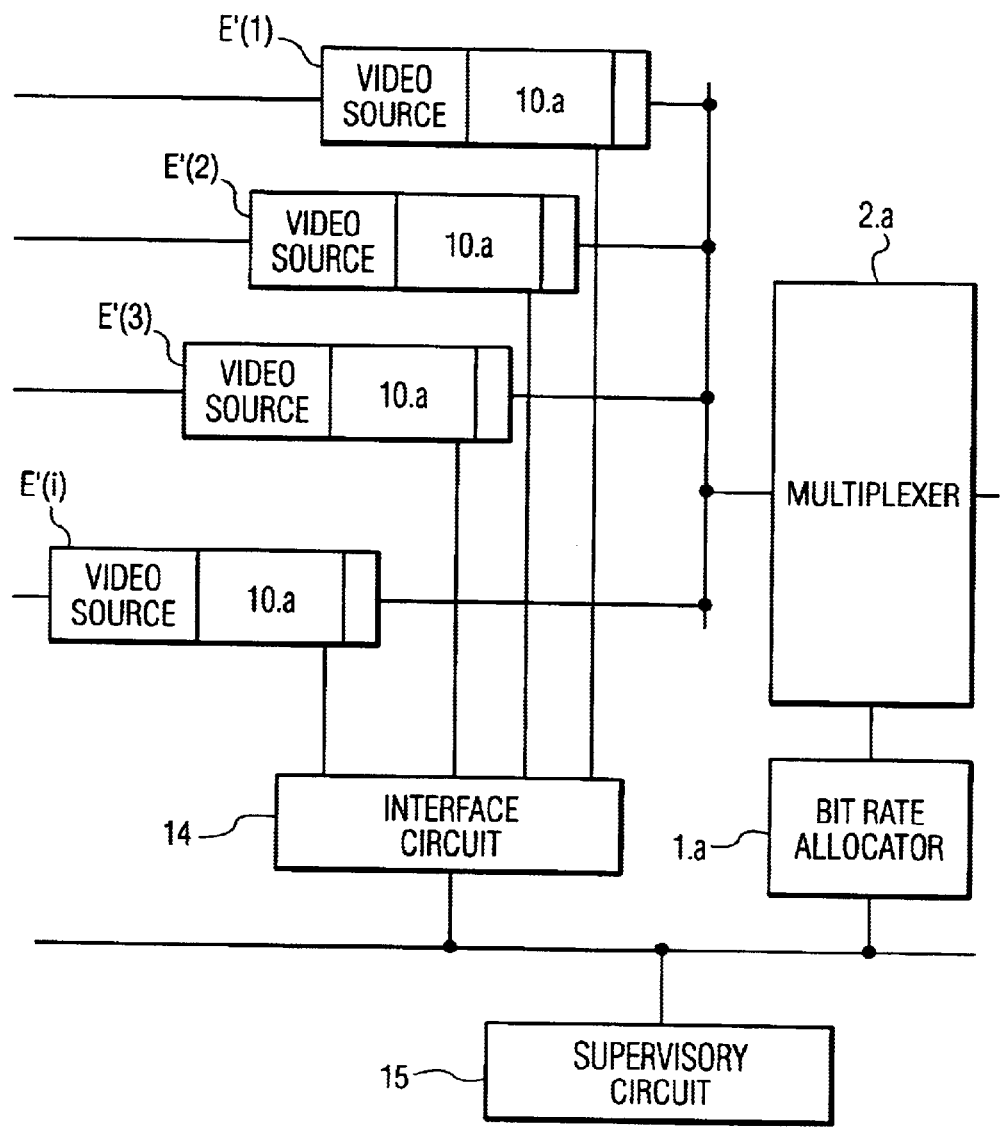
FIG. 2 represents a diagram of a statistical multiplexing system of the prior art.
Figure 3:
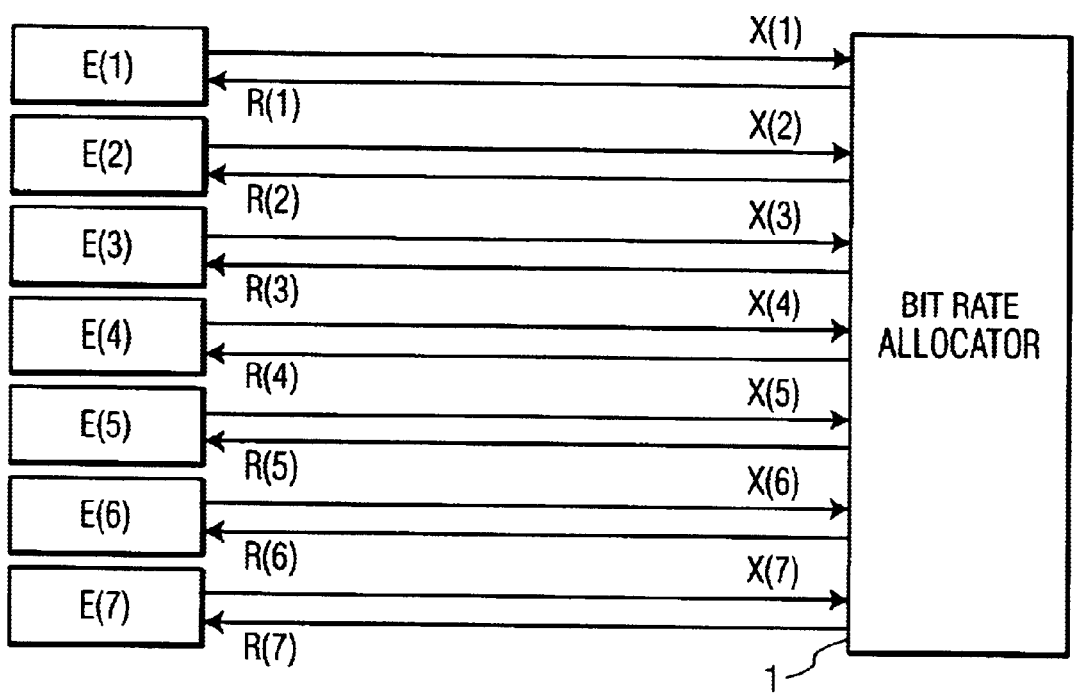
FIG. 3 represents a diagram of the messages exchanged in a statistical multiplexing system.

FIG. 3 represents a diagram of the messages exchanged in a statistical multiplexing system. Each encoder E(i), with i going from 1 to N, will transmit to the bit rate allocator (1) a complexity measurement Xi calculated by the basic formula (a). This calculation is carried out in the prior art by a bit rate regulating device (10.a, FIG. 2) integrated into each encoder E'(i). The bit rate regulating device (10.a, FIG. 2) transmits this calculated value of the complexity to the allocator. The allocator (1) collects the complexities Xi of each encoder E(i) and applies a rule of redistribution proportional to the requests.

$$R_i = \frac{X_i}{\sum_{j=1}^{N} X_j} \cdot MR$$

In this formula, Ri is the bit rate allotted to the encoder E(i) by the bit rate allocator (1) in response to the request Xi of the encoder E(i). The sum of the bit rates allotted corresponds to the bit rate constraint MR for the channel. In a steady state, this signifies that the bit rate has stabilized, that is to say that the variations in the bit rate of each encoder (E(i)) are small, and hence that the programs coded by the encoders E(i) have the same quantization level. This assumption is valid only if the quality of the image is determined by a quantization level and if the quantization level guarantees, regardless of the coded image, a constant rendition of subjective quality.

This principle is hardly relevant. Indeed, sports type program can be quantized more severely than a simple program (fixed-focus shot, for example).

More precisely, a fixed-focus shot comprises hardly any motion, homogeneous zones but fine details. For this type of shot, the eye tends to become sensitive to the least quantization effect on the uniform zones. Consequently, in order, subjectively, for the coding rendition to be satisfactory, a very low quantization level is required so as not to cancel out or not to decrease the accuracy of the coding of the coefficients of the matrix, so as not to introduce any quantization effect. Conversely, for a sports scene where there is a great deal of motion, there is enormous detail in the scene, the eye does not have time to integrate all the details, which implies that it is possible to quantize more severely with a higher quantization level, so as to cancel out a larger number of coefficients of the matrix, without there being any perceptible quantization effect. Now, applying in the steady state one and the same quantization level for all the types of images, necessarily results in a difference or dispersion in the quality between simple images and complex images.

The principle of the invention consists in introducing a modification of the complexity function by rendering it dependent not directly on the quantization interval, as in the prior art, but on a measure representing the coding quality which depends on the quantization level.

The principle of calculating the complexity of the next image to be coded, according to the invention, uses the information emanating from a first coding carried out for all the images intended to be coded according to the MPEG 2 standard. This first coding is carried out spatially for all the images, that is to say there is no motion compensation or search for temporal redundancy. Thus, at the output of this first coding, there are I images only. Moreover, this first coding is carried out with several lead images, thereby signifying that when an image is coded by the first coding, it will not actually be coded using an arbitrary group of pictures structure in accordance with the MPEG 2 standard, until a few images later, for example 2 images later. Thus, the calculation principle of the invention makes it possible to gain access, with a lead of, for example, two images, to the coding cost and to the quantization interval for each image if it had to be coded according to the spatial mode.

According to the principle of the invention, the complexity $X_{st}(n)$ of the next image actually coded, calculated by each encoder of a statistical multiplexing system using the principle of calculating complexity according to the invention is defined by formula (b):

$$X_{st}(n)=Q^{1st}{}_I(n+k) \cdot R(n-1) \quad (b)$$

In this formula, n is a temporal quantity, for example a frame or video image index, R(n−1) is the last bit rate allotted to the encoder by the bit rate allocator (1) and $Q^{1st}{}_I(n+k)$ is the quantization interval for the image which will be coded subsequently by the first coding and is determined by formula (c):

$$Q^{1st}{}_I(n)=X^{1st-}{}_I/T_I(n) \quad (c)$$

In this formula, $X^{1st-}{}_I$ is the complexity of the last image coded spatially in advance with respect to the current image. And $T_I(n)$ is the expected coding cost for the next image coded spatially in advance with respect to the current image and is determined by formula (d):

$$T_1(n) = \frac{X^{1st}{}_I}{X^-_{GOP}} \cdot \frac{N}{f_{pict}} \cdot R(n-1) \cdot G_{3:2}(n) \quad (d)$$

In this formula, $X^-_{GOP}$ is the complexity of the last group of pictures coded and is determined by formula (e):

$$X^-_{GOP}=X^{1st-}{}_I+N_P Z_P X^-{}_P+N_B Z_B X^-{}_B \quad (e)$$

In this formula, $N_P$ is the number of P images in the group of pictures, $N_B$ is the number of B images in the group of pictures, and $Z_P$ and $Z_B$ are weighting coefficients making it possible to give more or less weight to the P or B images according to their importance in the coding process by way of example $Z_P$=1.1 and $Z_B$=0.75.

In formula (e), $X^-{}_P$ and $X^-{}_B$ are the complexities of the last P and B images, respectively, and calculated according to the principle of formula (a) during the actual coding according to the structure of GOP in accordance with the MPEG 2 standard.

In formula (d), N is the number of images of a group of pictures and is equal to:

$$1+N_P+N_B$$

In formula (d) Rate (n−1) is the last stipulation of bit rate received by the coder and is expressed as number of bits per second, fpict is the frequency of the images per second, G3:2(n) is a coefficient which depends on the number of redundant frames in two consecutive images and is as a general rule between 1.0 and 1.5.

FIG. 1 represents a diagram of a statistical multiplexing system using the bit rate regulating device according to the invention.

In order to apply the calculation principle described previously, each encoder E(i) (or coder) of the statistical multiplexing system comprises a preprocessing device (40), allowing analysis of an incoming stream (41) of images digitized according to the standardized 4.2.2 format (CCIR601 standard). This device (40) is known per se and comprises a buffer memory making it possible to store a certain number of incoming images and to reorganize the stream of images with a view to coding. This preprocessing device (40) is connected firstly by a first link (42) to a device (50), known per se, for searching for the motion vectors for each image making it possible to exploit the temporal redundancy of the images. Secondly, the preprocessing device (40) is connected by a second link (46) to a first coding device (20) carrying out the first coding in spatial mode in advance with respect to the actual coding of the image. The preprocessing device (40) supplies this first coding device (20) with the digitized images received at input. Thirdly, the preprocessing device (40) is connected by a third link (47) to a second coding device (30) carrying out a second coding complying with the determined group of pictures structure in accordance with the MPEG 2 standard. The two coding devices (20, 30) each comprise, in a known manner, a module (21, 31) carrying out the discrete cosine transformation or DCT, a module (22, 32) carrying out the operation of quantizing the coefficients emanating from the DCT, and a module (23, 33) carrying out the VLC operation, of variable-length coding. In a noteworthy manner, the preprocessing device (40) supplies images I(n) of rank n to the second coding device (30) and simultaneously images I(n+k) of rank n+k, where k is at least equal to 2 to the first coding device (20). Thus, the incoming images entering the first coding device (20) are coded spatially with a lead time with respect to their actual coding by the second coding device (30).

The quantization module (32) of the second coding device (30) is connected to a module (34) carrying out an inverse quantization itself linked to a module (35) carrying out an inverse DCT transformation so as to reconstruct the image via a reconstruction module (36) comprising in particular a memory. The reconstructed image will serve as support in the motion estimation carried out by the motion estimator (50). This reconstructed image is transmitted via a link (51) from the reconstruction module (36) to the motion estimator (50). The reconstruction module (36) also receives, via a link (54), the motion vectors of the preceding images, which vectors are defined by the motion estimator (50).

The link (47) between the preprocessing device (40) and the second coding device (30) is effected through a differentiator device (60) which receives as input the images exiting the preprocessing device (40) and, via a link (52), the reference image stored in the memory (36). This differentiator device (60) carries out the difference, macroblock by macroblock between the images originating from the preprocessing device (40) and the reference image and transmits on its output connected to the second coding device (30) this difference which will be coded according to the principle described previously (DCT, quantization, VLC). The difference is performed by the differentiator device (60) only for the P or B images.

The motion estimator (50) is also connected by way of a link (53) to the second coding device (30). This link allows the motion estimator (50) to transmit the motion vectors resulting from the comparison of the reference image with the P or B images coded by the second coding device (30).

The second coding device (30) outputs a stream (300) of images coded according to the MPEG 2 standard to a multiplexer (2). The first coding device (20) is connected to a bit rate regulating device (10). This bit rate regulating device (10) constitutes the element of each coder E(i) which makes it possible to apply the previously defined principle of the invention. This device (10) analyses the stream of spatially coded images originating from the first coding device (20) via-the link (24) and determines, by way of a prerecorded program (M), the coding cost CI(n+k), as well as the quantization interval (QI(n+k) for each image coded by the first coding device (20). The index n+k indicates that this relates to the cost of the image received k images prior to the image to be coded, with k at least equal to 2. Likewise, in order to construct a regulating loop in a known manner, the bit rate regulating device (10) is also connected, on the one hand to the quantization module (32) of the second coding device (30), by a link (132), so as to supply to this quantization module (32) the quantization level QS(n) appropriate for the coding of the current image, and on the other hand to the output of this second coding device (30) so as to gather information about the cost CS(n) of 10 coding the images sent to the multiplexer (2). The regulating device (10) is also connected via a bidirectional bus (11) to the bit rate allocation device (1) or bit rate allocator of the statistical multiplexing system, so as on the one hand to send to the allocator for each image a request containing the value of the expected complexity Xst calculated according to formula (b) for this image, by way of transmission means, and on the other hand so as to receive from the allocator, for leach image, the bit rate stipulation R(i) corresponding to the request previously sent.

To calculate the value of the complexity according to formula (b), the bit rate regulating device (10) comprises, for example, a program P2 prerecorded in a memory (12) for calculating the value of the complexity according to formulae (b) to (d) on the basis of the information relating to the complexity $X^{1st-}|$ of the last image coded by the first coding device (20), the complexities $(X_P^-, X_B^-)$ of the last P image and of the last B image which were coded by the second coding device, and the last bit rate stipulation Rate(n−1) received from the bit rate allocator. This information is stored, for example, in the memory (12). The quantization interval for the image coded by the first (20) coding device used to calculate the complexity of the next image actually coded is that for the image which will be coded images later, by the second coding device (30), where k is for example equal to 2. The values cited previously are, for example, collected by a program prerecorded on the storage means (12) of the regulating device (10) and stored on these same means (12) or on different memories.

Figure 4:
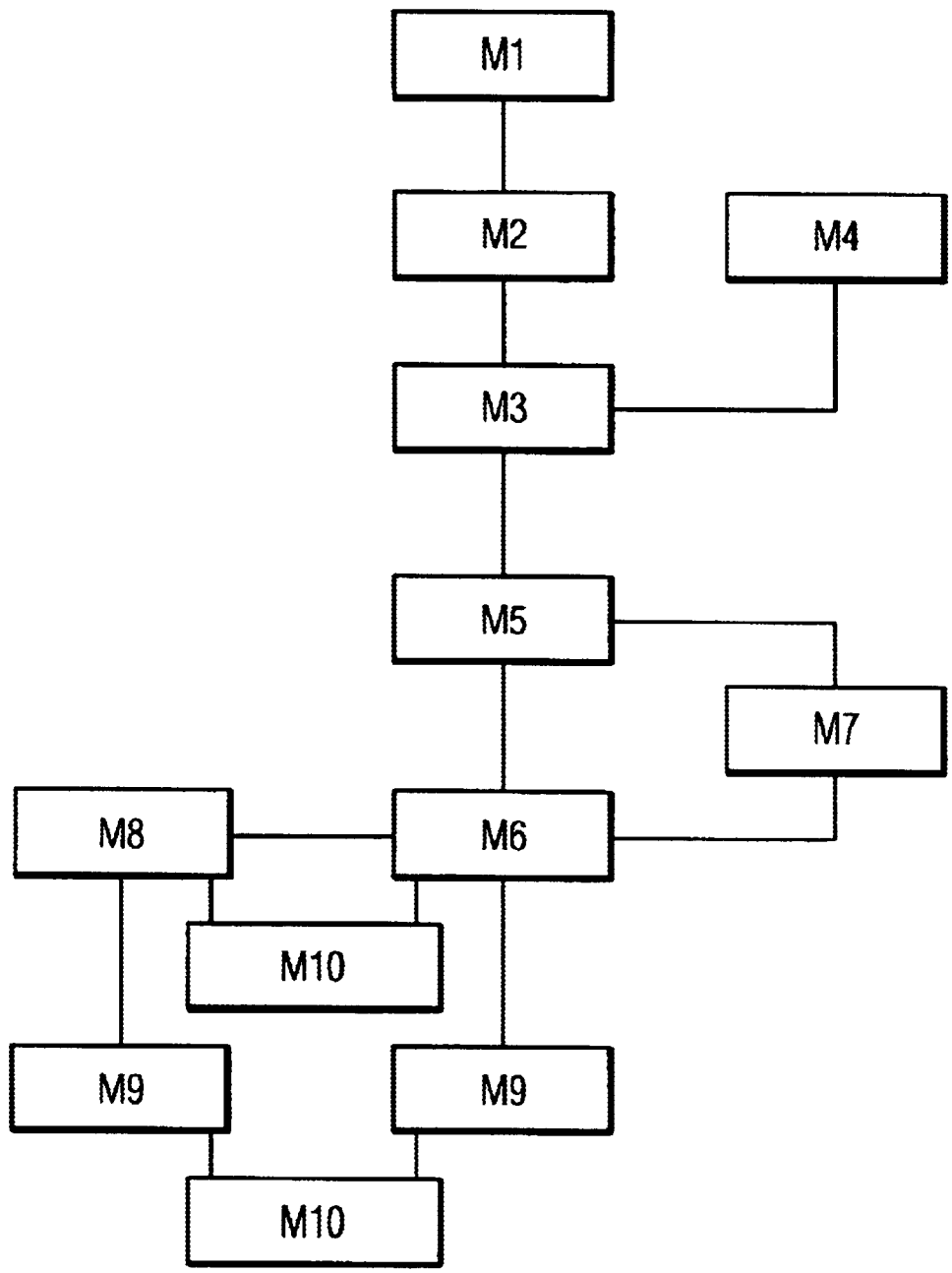
FIG. 4 represents the algorithm of the program for calculating the complexity of the regulating device according to the invention.

The program (P2) calculates the complexity $X^{st}$ defined by formula (b) and operates according to the algorithm of FIG. 4. This program comprises, for example, a plurality of modules executed by an integrated circuit.

A first module (M1) stores the value of the complexity $X^{1st}_{|}$ of the last image coded by the first coding device (20). A second module (M2) calculates via the algorithm of formula (e), then stores the value of the global complexity X GOP of the last group of pictures (GOP) coded by the second coding device (30), using, on the one hand the complexity values $(X_P^-, X_B^-)$ of the last P and B images coded and stored, for example, in the memory (12) of the bit rate regulating device, and on the other hand the constants $N_P, Z_P, N_B, Z_B$, prerecorded, for example, in the memory (12) of the bit rate regulating device, characterizing the structure of the GOP. On the basis of this complexity value $X^-_{GOP}$ of the complexity $X^{1st-}|$ of the last image coded by the first coding device (20), a third module (M3) of the program (P2), calculates then stores, for example in the memory (12) of the bit rate regulating device (10), the value Ti(n) defined by formula (d) and corresponding to the cost of coding the next image coded by the first coding device (20). The constants N, fpict and G3:2(n) are, for example, stored in the memory (12) of the bit rate regulating device. Likewise, the last bit rate R(i) allotted by the bit rate allocator (1) is also collected and then stored in the memory (12) of the bit rate regulating device (10) by a fourth module (M4) of the program (P2) for calculating the complexity.

A fifth module (M5) of the program (P2) for calculating the complexity calculates, via formula (c), the quantization interval or level $Q^{1st}_I$ envisaged in the respect of the coding of the next image by the first coding device (20) on the basis of the values $T_I(n)$ and $X^{1st}_I$ previously calculated and/or stored by the first (M1) and third (M3) module. Lastly, a sixth module (M6) calculates the value of the complexity $X^{st}$ on the basis of the calculated values of the quantization interval $Q^{1st}_I$ which were stored by the fifth module and of the last bit rate R(i) collected and stored by the fourth module (M4). Once calculated, this complexity value $X^{st}$ is transmitted by the bit rate regulating device (10), via means of transmission, to the bit rate allocator (1).

Thus, this particular calculation of the complexity $X_{st}$ used by the bit rate regulating device (10) in the request to the bit rate allocator (1) makes it possible to supply the bit rate allocator (1) with an estimate of the complexity of the next image to be coded by the second coding device (30) with a lead time. Likewise, formula (b) makes it possible, for example, to introduce corrections so as to refine the determination of the complexity.

In a second variant embodiment of the bit rate regulating device (10), a first adjustment is, for example, used in such a way as to limit the variations in the complexity for the low values of the quantization level. Indeed, when the quantization level goes, for example, from the value 1 to the value 2, according to formula (b), the value of the complexity will therefore double. In response to this complexity request, the allocator will therefore supply double the bit rate value. Now, this bit rate is not necessarily relevant with respect to the content of the image whose quantization level is 2. Consequently, in order to avoid too great a variation in the bit rate allotted in response to a complexity request, the value of the quantization level $Q^{1st}_I(n+k)$ of formula (b), for example for k equal to 2, is replaced by:

$$Q_{mst}(n) = \text{MAX}\ (Q^{1st}_I(n),\ Q^{1st}_I(n+1),\ Q^{1st}_I(n+2))$$

Thus formula (b) becomes:

$$X_{mst}(n) = Q_{mst}(n) \cdot R(n-1)$$

In order to carry out this calculation, the program P2 for calculating the complexity of the regulating device (10) according to the invention comprises a seventh module (M7) making it possible to store the values of the quantization interval for the images previously coded by the first coding device (20), for example, in the memory (12) of the bit rate regulating device (10). The quantization intervals are those calculated by the fifth module. This seventh module (M7) also carries out a comparison between these quantization intervals so as to determine and store the maximum value $Q_{mst}$. The sixth module (M6) is modified so as to use this value during its implementation so as to carry out the calculation of the complexity $X_{mst}$ according to the previous formula by using the result $Q_{mst}$ and not now according to the initial formula (b).

In the above example, only the quantization intervals for the last three images coded by the first coding device are stored. However, it is possible to envisage a different number of quantization intervals.

In a third variant embodiment of the bit rate regulating device (10), a second adjustment is, for example, used to compensate for the oscillation phenomena during the bit rate allocation, this oscillation being due to the reaction time of the bit rate allocator.

Indeed, the principle of bit rate allocation is a predictive principle, consequently, let us take the example where at an instant t a request with a high value of complexity is sent by the bit rate regulating device (10). In return, the bit rate allocator (1) will respond at an instant t+t0 by allotting a large bit rate. If at this instant t+t0 the current image possesses, in fact, a low complexity, the bit rate will not be adapted, and the bit rate regulating device (10) will correct this difference by sending a request with a low complexity. To avoid these fluctuations, the value of the complexity sent by the bit rate regulating device (10) according to the invention is:

$$X_{dmst}(n) = \text{MAX}\left[X_{mst}(n), \frac{1}{g}\sum_{i=0}^{i=g-1} X_{mst}(n-i)\right] \quad (b.1)$$

To carry out this calculation, the programme P2 for calculating the complexity of the bit rate regulating device (10) according to the invention comprises an eighth module (M8) making it possible to store the last complexity values ($X_{st}$ or $X_{mst}$) calculated by the sixth module (M6) unmodified or by the sixth module (M6) modified according to the second variant, for example, in the memory (12) of the bit rate regulating device (10). This eighth module (M8) also carries out the calculation of a mean of the complexity values stored and a comparison of the last complexity value with this mean so as to determine the larger of the two values which will be the value $X_{dmst}$ sent in the request destined for the bit rate allocator (1) via the means of transmission of the bit rate regulating device (10). The value g is determined as a function of the reaction time of the bit rate allocator (1) so as to respond to a request from the bit rate regulating device according to the invention and is preferably equal to 8.

In formula (b.1), the first adjustment is also taken into account, that is to say the complexity values stored are those calculated by the sixth module modified. When the complexity values are those calculated by the sixth module unmodified, formula (b.1) becomes:

$$X_{dst}(n) = \text{MAX}\left[X_{st}(n), \frac{1}{g}\sum_{i=0}^{i=g-1} X_{st}(n-1)\right] \quad (b.1.2)$$

As explained previously, it is known that the images having high complexity may be quantized severely since human vision does not make it possible to integrate all the details of a complex image. On the contrary, vision is sensitive to the effects of quantization on an image of low complexity. To correct this psychovisual aspect, a third adjustment is carried out on the value of the complexity.

$$X_{pdmst}(n)=\text{sqrt}(X_{dmst}(n)) \quad (b.2)$$

In this formula, the function sqrt( ) corresponds to the square root function. This function is carried out by a ninth module (M9) of the programme P2 for calculating the complexity.

In the preceding formula, the complexity to which the square root is applied is the complexity emanating from the calculation carried out by the eighth module (M8) and the sixth module (M6) modified. However, it is possible to apply this third adjustment to the complexity calculated by the eighth module (M8) and the sixth module (M6) unmodified and in this case formula b.2 becomes:

$$X_{pdst}(n)=\text{sqrt}(X_{dst}(n)) \quad (b.2.1)$$

or again this third adjustment is applied to the complexity calculated by the eighth module (M8) and the sixth module (M6) modified and in this case formula b.2 becomes:

$$X_{pmst}(n)=\text{sqrt}(X_{st}(n)) \quad (b.2.2)$$

or finally this third adjustment is applied to the complexity calculated by the eighth module (M8) and the sixth module (M6) unmodified and in this case formula b.2 becomes:

$$X_{pst}(n)=\text{sqrt}(X_{st}(n)) \quad (b.2.3)$$

In order to comply with the maximum and minimum complexity thresholds allowable by the bit rate allocator (1), the value of the complexity is, for example, modified by a fourth adjustment defined by the following formula:

$$X_{cpdmst}(n)=\text{MIN}(S_{max}, \text{MAX}(S_{min}, K \cdot X_{pdmst}(n))) \quad (b.3)$$

The values $S_{max}$ respectively $S_{min}$ are parametrizable and represent the maximum threshold respectively the minimum threshold of the complexity allowable by the allocator. By way of example, $S_{max}$ is equal to 100 and $S_{min}$ is equal to 1, and the value K is equal to 0.01.

In order to apply this fourth adjustment, the program P2 for calculating complexity according to the invention comprises a tenth module (M10) which makes it possible to carry out a comparison according to formula b.3 between the values of $S_{min}$ and $S_{max}$ which are stored, for example in that memory (12) of the bit rate regulating device in which are stored the values of $S_{min}$ and $S_{max}$ and a prerecorded programmer comprising a comparison module, and the value of the complexity calculated by the ninth module according to formula b.2. However, the complexity used can be calculated according to any one of the formulae b, b.1, b.2.1, b.2.2, b.2.3.

The four preceding adjustments make it possible to adjust the value of the complexity sent by the bit rate regulating device (10) according to the invention to the bit rate allocator (1) when the image stream is steady, that is to say when there is a certain homogeneity or continuity in the stream of images to be coded. This mode of operation is the steady mode of operation of the regulating device (10) according to the invention.

This regulating device (10) according to the invention can also comprise elements making it possible to manage the discontinuities of the stream of images to be coded, that is to say changes of scene (or scene cut) and lap dissolves (fading) occurring in an image sequence. It is known to the person skilled in the art that these two transient phenomena are critical for an encoder E(i). Indeed, the coding according to the MPEG 2 standard is predictive. Consequently, a change of scene or a lap dissolve disturbs the prediction mechanisms. It is also known that these two transient phenomena demand a very considerable bit rate in order to preserve satisfactory image quality.

The principle of the invention consists in making provision for these transient phenomena and consequently in demanding a bit rate adapted to these phenomena. The detection of these phenomena is performed, for example, by the preprocessing device (40) of the encoder. As explained previously, the preprocessing device (40) is capable of performing a measurement of the correlation (inter correlation) between two successive images and respectively between the lines of one and the same image (intra correlation). These measurements are, for example, carried out by a first device (400, 401) for measuring inter correlation and respectively a second device for measuring intra correlation. On the basis of the measurements carried out by these two devices (400, 401), it is possible to detect a change of scene or a lap dissolve.

The detection of lap dissolve is carried out by the second measurement device (401) and corresponds to the detection of an abrupt variation in the intra correlation. The intra correlation corresponds to the line-by-line sum of the difference between a first pixel of a first line and a second pixel of the adjacent line, the second pixel having the same horizontal position on this line as the first pixel on the first line. Thus, the presence of a lap dissolve corresponds to a rapid decrease and then to a rapid increase in the intra correlation. The second measurement device (401) comprises a program making it possible to detect a rapid decrease and then a rapid increase in the intra correlation. The second measurement device (401) is also connected to the bit rate regulating device (10) according to the invention by a link (43) and sends a signal (F) representative of the detection of a lap dissolve to the bit rate regulating device (10) as soon as the second measurement device (401) detects a lap dissolve. As soon as this signal (F) is received by the bit rate regulating device (10) according to the invention, the latter device sends to the bit rate allocator (1), for the next h+1 images, where h is the number of images of the groups of pictures, a complexity value $X_F(n)$ equal to the maximum complexity threshold $S_{max}$ allowable by the allocator, by way of its transmission means. Threafter, that I to say for the h+$2^{nd}$ image, the bit rate regulating device (10) according to the steady mode described previously.

The first measurement device (400) is constructed on the basis of a preprocessing device, of the prior art, making it possible to detect a change of scene. These devices of the prior art are based on the analysis of the measurement of the inter correlation, that is to say on the line-by-line sum of the differences between a first pixel of a first image and a second pixel of a second image, this second pixel having the same position in the second image as the first pixel in the first image. The first measurement device (400) according to the invention also comprises a device making it possible to evaluate, without calculating it, the complexity of the images subsequent to the change of scene. This evaluating device supplies a measurement SC of the decorrelation of the inter correlation. Once evaluated, this value SC is transmitted to the regulating device (10) by way of a link (44). The receiving of this value (SC) by the bit rate regulating device (10) according to the invention prompts the calculation and then the sending for e following images, of a complexity defined by the formula:

$$XSC(n) = MAX(X_{cpdmsi}(n), f(SC)).$$

In this formula, f is a function making it possible to determine the complexity of an image as a function of the value of the decorrelation SC.

The value e corresponds to the number of images contained in the buffer memory of the preprocessing device. Thereafter, for the following image, that is to say for the e+one th image, the bit rate regulating device (10) again operates according to the steady mode described previously.

Figure 5:
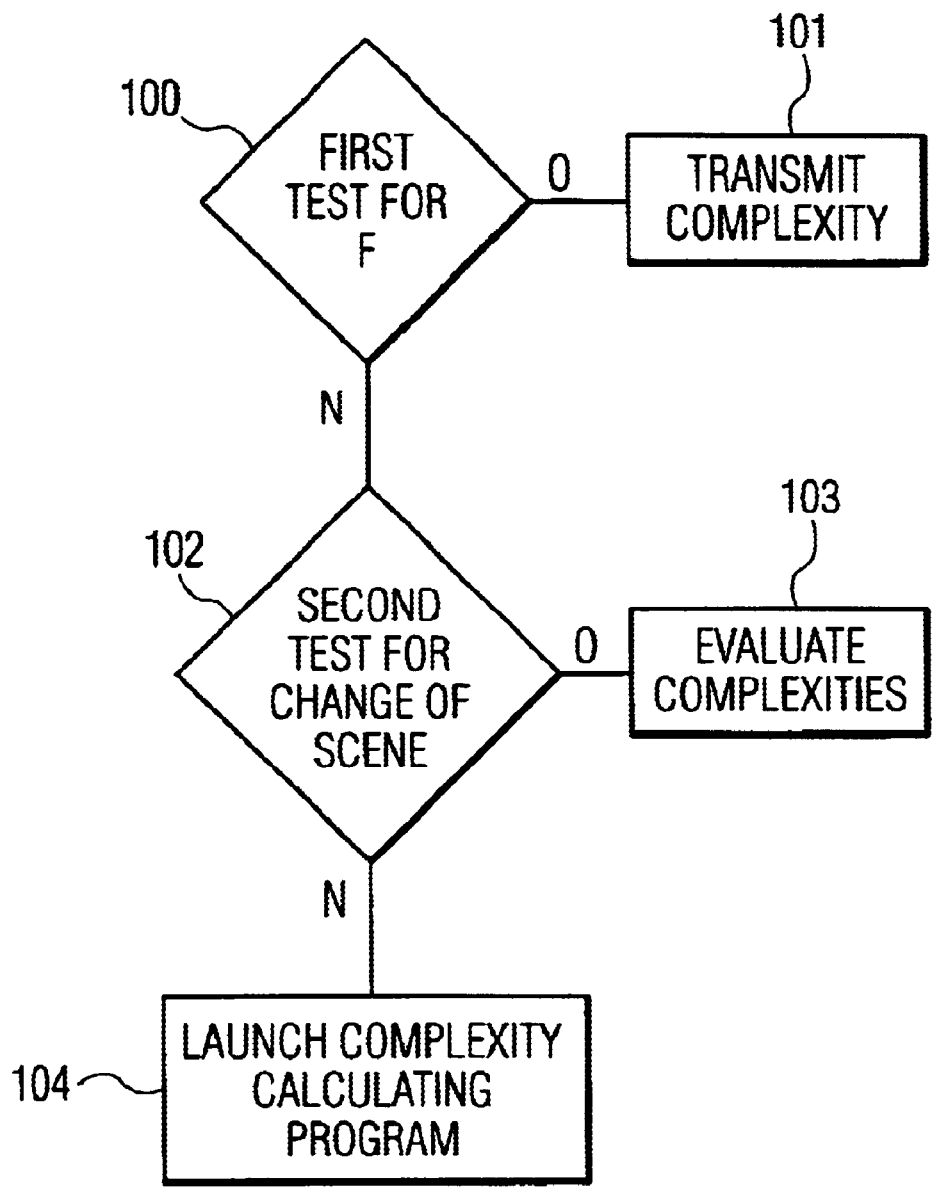
FIG. 5 represents the logic flowchart of the program for detecting change of scene and lap dissolve of the bit rate regulating device according to the invention.

This reaction of the bit rate regulating device (10) in response to the signals transmited by the preprosessing device (40) indicating the presense of a change of scene or a lap dissolve is implemented for example, by a detention program P3 carriying out the logic flowchart of FIG. 5. This program P3 is, for example, stored on the memory (12) of the bit rate regulating device (10).

This detection program (P3) carries out continuous monitoring of the links (43, 44) originating from the detection devices (400, 401) of the preprocessing device (40). As soon as a signal (SC change of scene or F lap dissolve) is transmitted on one of the aforesaid links (43, 44), the program (P3) performs a first test (100) to check whether the signal is a lap dissolve detection signal (F). If so, the program transmits (101) a complexity equal to the maximum threshold for a number h of following images, to the bit rate allocator, by way of the transmission means of the bit rate regulating device (10). Otherwise, the program P3 carries out a second test (102) to check whether the signal (SC) is a change of scene detection signal. If so, the program P3 evaluates (103) the complexity which will be transmitted for a number e of following images, to the bit rate allocator, by way of the transmission means of the bit rate regulating device (10). This evaluation is performed as a function of the measurement SC of the inter correlation carried out by the first measurement device (400) and transmitted by the link (44). If not, the program P3 triggers (104) the launching of the programmer P2 for calculating the complexity defined previously.

It is clear that other modifications within the scope of the person skilled in the art come within the framework of the invention. In particular, the bit rate regulating device according to the invention can be replaced by a regulating device of the prior art into which is integrated or to which is connected a specific device carrying out the novel functionalities described previously.

What is claimed is:

1. Device for regulating bit rate in a system for statistical multiplexing of several streams of images coded by coders E(i) according to MPEG 2 coding, integrated into each coder E(i), the statistical multiplexing system comprises a device for allocating bit rate using a complexity calculated by a bit rate regulating device, each coder E(i) of each stream comprising a first coding device carrying out a first spatial coding of all images to be coded so as to determine coding cost for each image if it had to be coded spatially and in advance with respect to their second actual coding by a second coding device, wherein storage means stores the complexity $X^{1st-}|$ of the last image coded spatially by the first coding device, the complexity $(X^-{}_{GOP})$ of the last group of pictures actually coded by the second coding device, the last bit rate Ri allotted by the bit rate allocation device, the device for regulating bit rate of the coder E(i) determines the complexity value for the next image coded by the second coding device, by way of a prerecorded program (P2) executed by integrated circuits and using the stored values, and the bit rate regulating device also comprises means for transmitting this complexity value to the bit rate allocator for the determination of the next bit rate of stipulations sent to the coder E(i).

2. Bit rate regulating device according to claim 1, wherein the quantization interval ($Q_{mst}$) used by the bit rate regulating device to determine the complexity of the image to be coded is the maximum quantization interval between the last three quantization intervals determined by the bit rate regulating device, during the coding by the first coding device.

3. Bit rate regulating device according to claim 1, wherein the bit rate regulating device comprises a module (M8) for determining mean of the complexities sent by the regulating device to the bit rate allocator for a determined number of preceding images, and a module for determining, by way of a comparator, a maximum value between this mean and the value of the last complexity ($X_{dmst}$) calculated and stored, this value corresponding to the value transmitted by the bit rate regulating device to the bit rate allocator by the transmission means.

4. Bit rate regulating device according to claim 1, wherein the regulating device comprises first means (M9) for calculating a square root of the value of the complexity previously calculated by the program (P2), this value corresponding to the value transmitted by the bit rate regulating device to the bit rate allocator by the transmission means.

5. Bit rate regulating device according to claim 4, wherein the bit rate regulating device comprises second means (M10) for performing a minimum thresholding $S_{min}$ and a maximum thresholding $S_{max}$ of the value of the complexity.

6. Bit rate regulating device according to claim 5, wherein the thresholding of the complexity is carried out by a comparator which determines the minimum value between, the maximum threshold, and the maximum between the minimum threshold and the last complexity calculated which is multiplied by a determined coefficient.

7. Bit rate regulating device according to claim 5, wherein the first and second means consist respectively of program (P2) modules (M9, M10) recorded on the storage means.

8. Bit rate regulating device according to claim 1, wherein the bit rate regulating device is connected to a preprocessing device which comprises at least one measurement device for detecting a change of scene and/or a lap dissolve by performing an analysis of the correlation between two successive images (inter correlation) between the pixel line of one image and the line of like rank of the following image, or an analysis of the correlation within an image (intra correlation) between the lines of one and the same image, the result of this analysis is transmitted to the bit rate regulating device which comprises means (P3) for determining a complexity value ($X_{SC}$ or $X_F$) adapted to the change of scene and/or to the lap dissolve, this value corresponding to the value transmitted by the bit rate regulating device to the bit rate allocator by the transmission means.

9. Bit rate regulating device according to claim 7, wherein the preprocessing device which comprises a device for measuring intra correlation, after having successively detected a decorrelation then a recorrelation within an image, sends a signal (F) to the bit rate regulating device, which is analyzed as the detection of a lap dissolve, and the bit rate regulating device assigns in respect of a determined number of following images to be coded, a complexity value ($X_F$) corresponding to the maximum threshold, the number of following images to be coded corresponding to the number of images contained in a group of pictures increased by one picture, this value corresponding to the value transmitted by the bit rate regulating device to the bit rate allocator by the transmission means.

10. Bit rate regulating device according to claim 7, wherein
the preprocessing device, which comprises a device for measuring inter correlation, after having detected a strong decorrelation between two successive images, sends a signal (SC) to the bit rate regulating device representative of the measurement of the level of decorrelation between the two images, this signal (SC) being analyzed by the bit rate regulating device as the detection of a change of scene, so as to evaluate the complexity ($X_{SC}$) which will be applied to a determined number of following images, as a function of the decorrelation level calculated by the preprocessing device.

11. Process for regulating bit rate of each coder (E(i)) of a statistical multiplexing system comprising a bit rate allocation device connected to each bit rate regulating device of each coder (E(i)), each coder (E(i)) comprising a first coding device carrying out the spatial coding and with a lead time for all the images actually coded subsequently by a second coding device, the process comprising the steps of:
storing values representative of the complexity $X^1st$ of the last image coded by the first coding device, of the complexity $X^-_{GOP}$ of the last group of pictures coded by the second coding device, and of the last bit rate (R(i)) received by the bit rate regulating device,
calculating the complexity of the next image coded by the second coding device on the basis of the values previously stored, and
transmitting the complexity value of the next image coded by the second coding device to the bit rate allocation device.

12. Bit rate regulating process according to claim 11, further comprising the step of:
determining the complexity of the next image coded by the second coding device as the square root of the complexity determined by the first calculation step.

13. Bit rate regulating process according to claim 11 further comprising the steps of:
analyzing a measurement of the correlation between two images making it possible to determine the presence of a change of scene and a quantity representative of the level of decorrelation between JL the two images,
transmitting a signal representative of the detection of a change of scene and a quantity representative of the level of decorrelation between the two images to the bit rate regulating device,
evaluating, by the bit rate regulating device, the value of the complexity of a determined number of images subsequently coded by the second coding device, as a function of the quantity representative of the level of decorrelation between the two images, and
of transmitting by the bit rate regulating device the value of the complexity for the determined number of images to the bit rate allocator.

14. Bit rate regulating process according to claim 11, comprising the steps of:

analyzing the measurement of the correlation between the lines of one and the same image so as to determine the presence of a lap dissolve in a sequence of images, of transmitting a signal (F) representative of the detection of a lap dissolve to the bit rate regulating device, and corresponding to the detection of a decorrelation then of a recorrelation between a pixel line of an mage and the line of like rank of the same image, and transmitting, by the bit rate regulating device, to the bit rate allocator, a value of the complexity for a determined number of images subsequently coded by the second coding device, the value of the complexity corresponding to the maximum threshold of complexity allowable by the bit rate allocator.

* * * * *